Sept. 18, 1951 J. S. BOOTH 2,568,268
HUMIDITY CONTROL APPARATUS FOR REFRIGERATORS
Filed Oct. 1, 1949 5 Sheets-Sheet 1
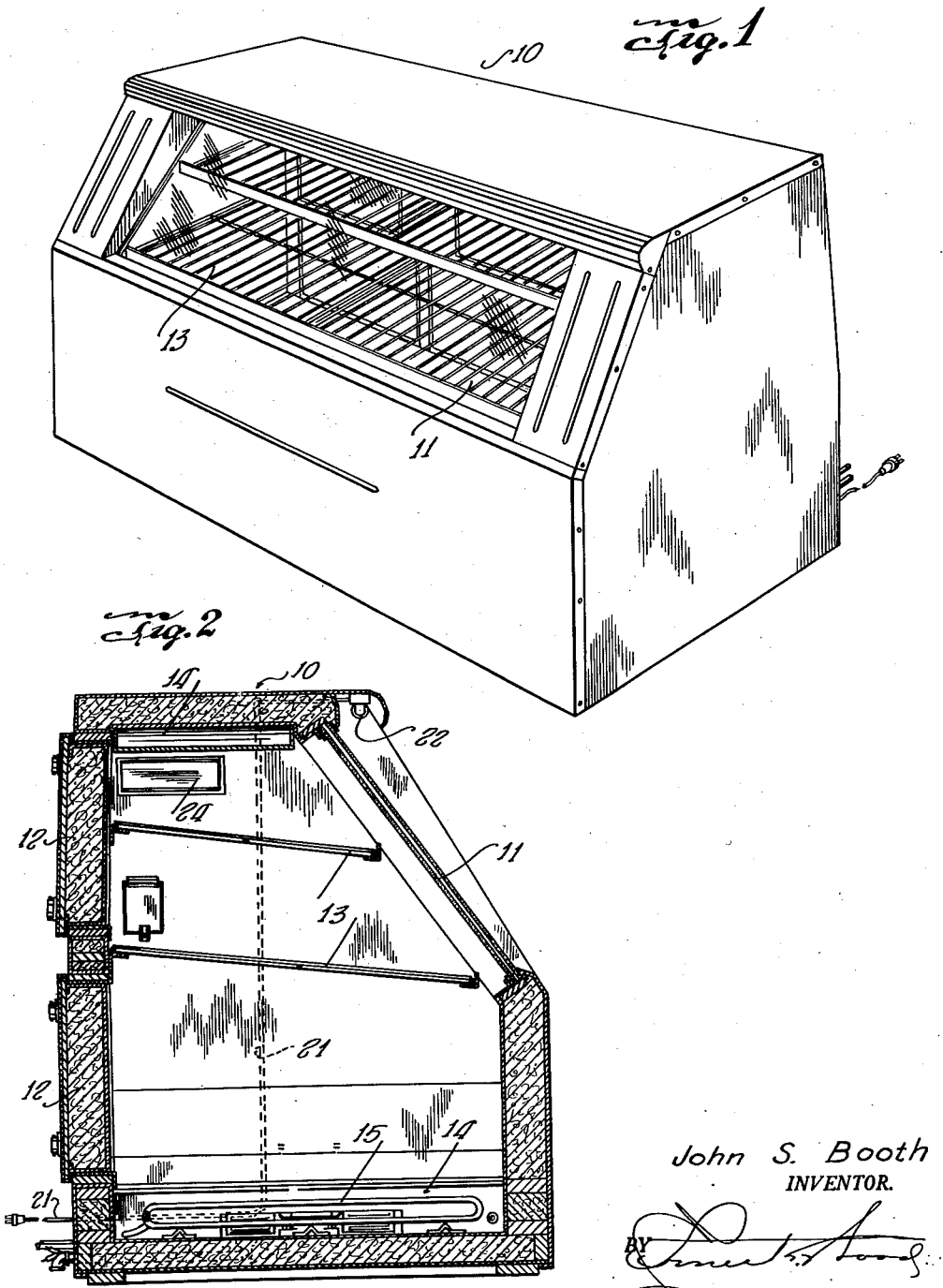
John S. Booth
INVENTOR.
ATTORNEY Sept. 18, 1951　　　　　J. S. BOOTH　　　　　2,568,268
HUMIDITY CONTROL APPARATUS FOR REFRIGERATORS
Filed Oct. 1, 1949　　　　　　　　　　　5 Sheets-Sheet 2
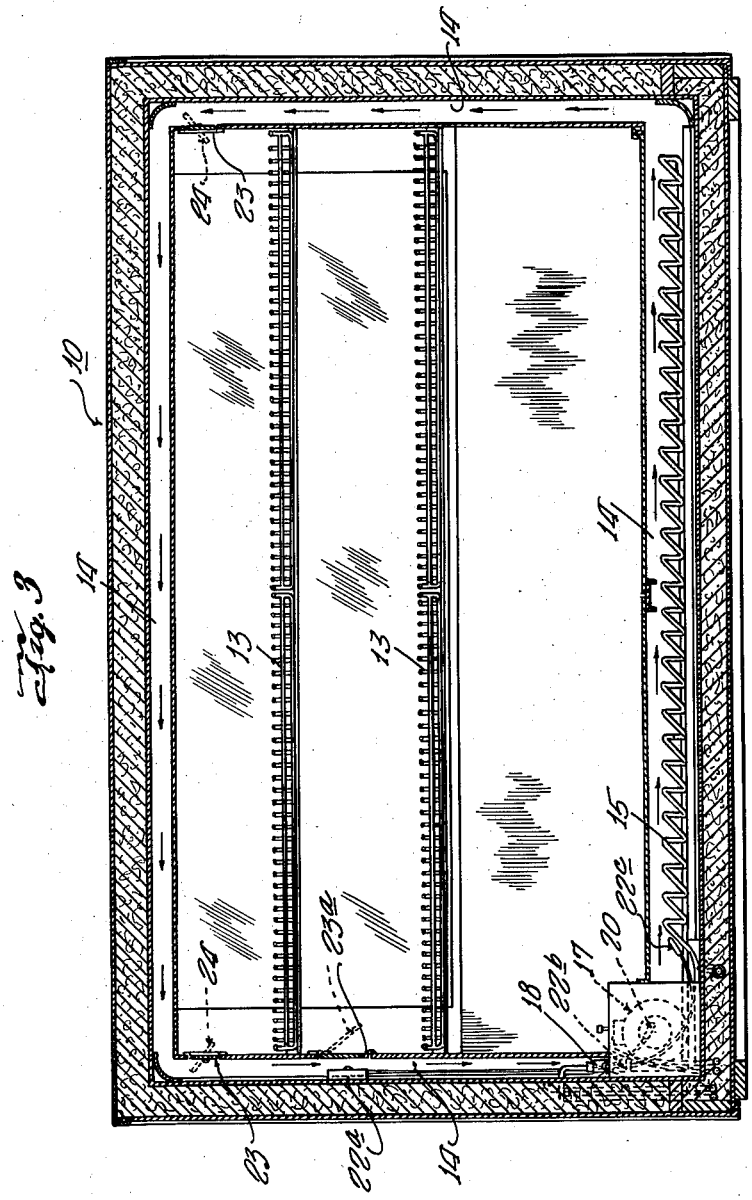
John S. Booth
INVENTOR.
ATTORNEY Sept. 18, 1951  J. S. BOOTH  2,568,268
HUMIDITY CONTROL APPARATUS FOR REFRIGERATORS
Filed Oct. 1, 1949  5 Sheets-Sheet 3
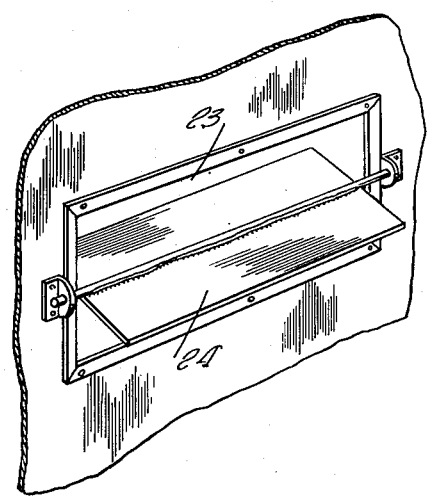
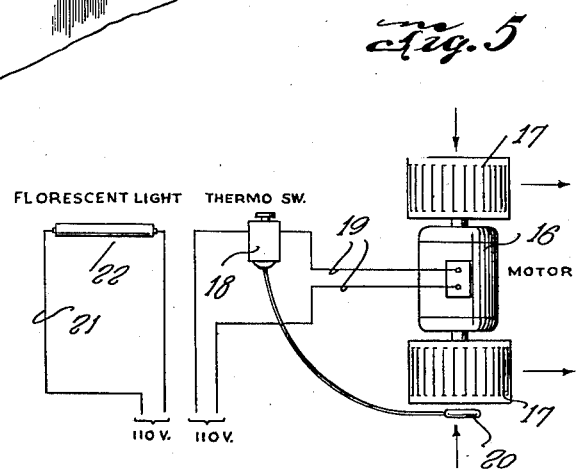
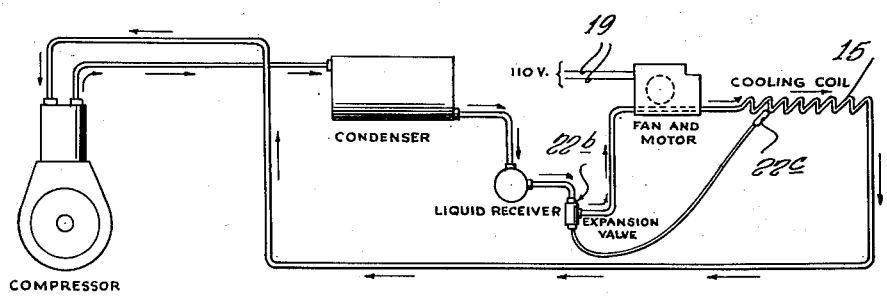
John S. Booth
INVENTOR.
BY
ATTORNEY Sept. 18, 1951 J. S. BOOTH 2,568,268
HUMIDITY CONTROL APPARATUS FOR REFRIGERATORS
Filed Oct. 1, 1949 5 Sheets-Sheet 4
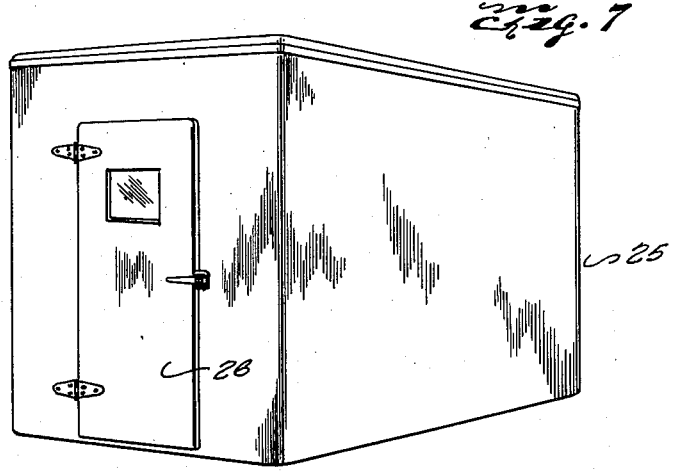
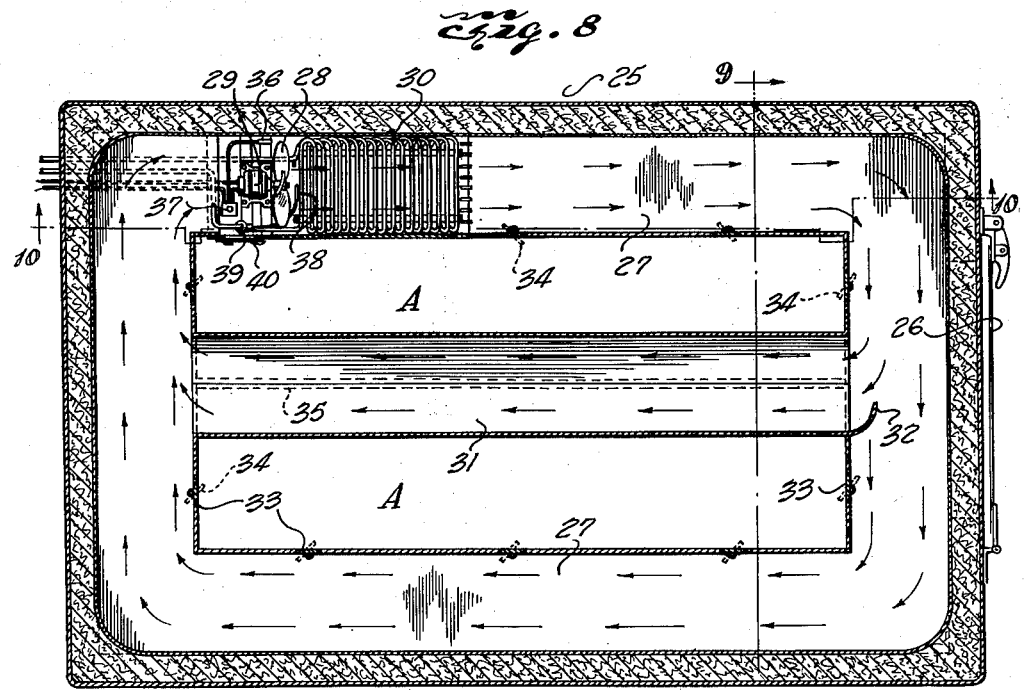
John S. Booth
INVENTOR.
ATTORNEY Sept. 18, 1951 J. S. BOOTH 2,568,268
HUMIDITY CONTROL APPARATUS FOR REFRIGERATORS
Filed Oct. 1, 1949 5 Sheets-Sheet 5
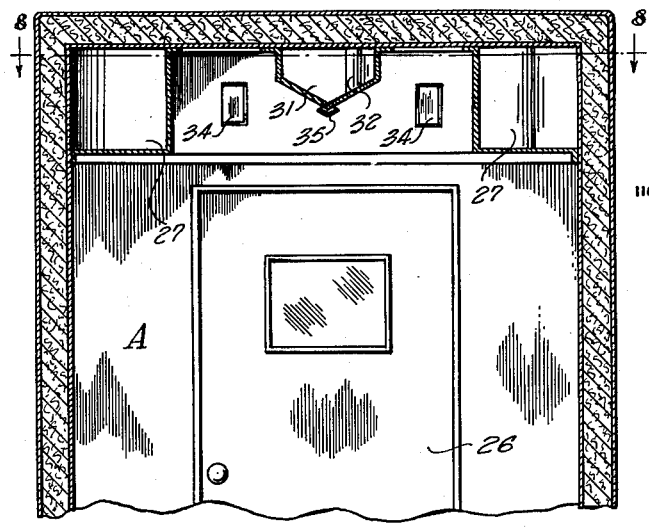
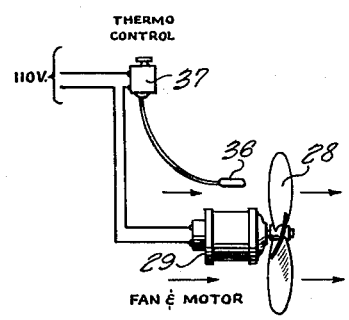
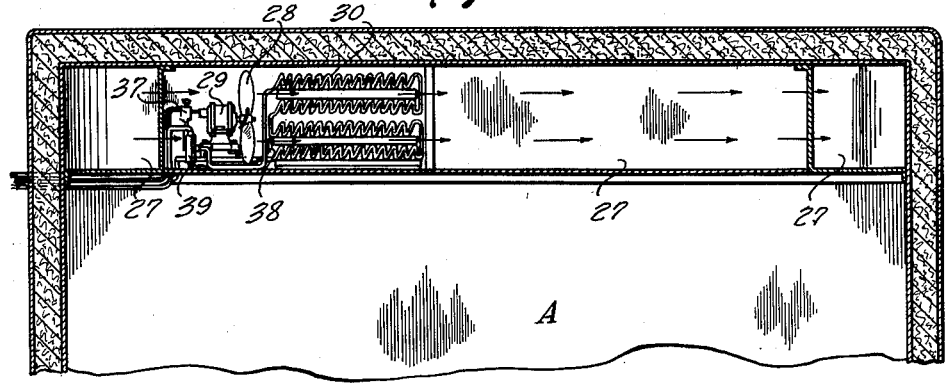
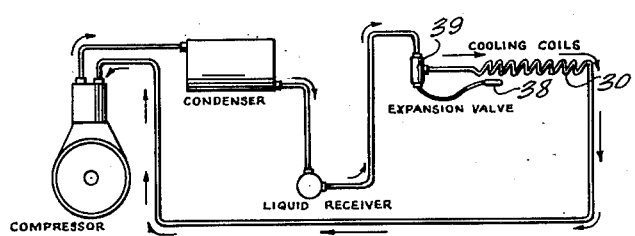
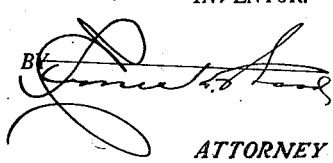
John S. Booth
INVENTOR.
ATTORNEY Patented Sept. 18, 1951

2,568,268

UNITED STATES PATENT OFFICE 2,568,268

HUMIDITY CONTROL APPARATUS FOR REFRIGERATORS

John S. Booth, Dallas, Tex.

Application October 1, 1949, Serial No. 119,152

2 Claims. (Cl. 62—102)

This invention relates to refrigerating equipment and more particularly to refrigerated food display and storage cases.

The principal object of the invention is to provide a refrigerated case especially designed to prevent dehydration or desiccation and discoloration of fresh meats stored therein by causing forced circulation of refrigerated air around the food storage compartment and isolating from the latter the refrigerating coils, thus to prevent, except in extreme cases, contact with the coils of external air admitted into the storage compartment through heat leakage or by opening the doors of the case. In this manner, frosting of the coils and consequent absorption of moisture in the storage compartment is obviated, thereby preventing dehydration or discoloration of meats therein or in restoring moisture and color to meats which have previously been deprived thereof.

Another object of the invention is to provide a refrigerating case, especially for meats in which a continuous duct or passage is provided for refrigerated air about the storage compartment, with provision, in the form of damper controlled openings between the passage and compartment, for admitting into the latter refrigerated air from the passage only in cases when frequent opening of the doors of the case cause excessive condensation of moisture on the inner wall surfaces of the storage compartment, resulting in over-moisturization of the contents of the latter.

Other objects will appear as the description proceeds, taken in connection with the accompanying drawings, wherein:

Figure 1 is a front perspective view of a refrigerated display case in which the invention is incorporated.

Figure 2 is a vertical sectional view thereof.

Figure 3 is a longitudinal sectional view.

Figure 4 is a fragmentary view showing one of the dampered vents between the refrigerated air passage and food storage compartment of the case.

Figure 5 is a diagram of the wiring for the illuminating and air circulating means within the case.

Figure 6 illustrates schematically the refrigerating system of the case.

Figure 7 is a front perspective view of a walk-in type refrigerator to which the invention is also adaptable.

Figure 8 is a sectional view of the refrigerator with the top removed to reveal the closed air duct.

Figure 9 is a vertical sectional view taken on line 9—9 of Figure 8.

Figure 10 is a sectional view taken on line 10—10 of Figure 8.

Figure 11 is a detail view of the circulating fan and circuit, and

Figure 12 is a schematic view of the refrigerating system.

Continuing with a more detailed description of the drawing, reference numeral 10 denotes generally the insulated case which may be of any desired external shape or design. As shown, the case is of the display type, having a glass front 11 and upper and lower rear doors 12. Suitable merchandise supporting racks 13 are arranged within the food storage compartment of the case.

Surrounding the food storage compartment longitudinally is a continuous air duct 14. This duct is defined by spacing the end walls, top and bottom of the storage compartment from the ends, top and bottom of the case and by sealing off the passage thus formed from the interior of the food compartment so that there will be no exchange of air between the compartment and passage except under such circumstances as will be presently described.

That portion of the continuous air duct 14 extending along the bottom of the food storage compartment is deeper than the remaining portion thereof in order to define a refrigerating compartment and to accommodate a refrigerating coil 15, composed of flattened convolutions and extending nearly the full length of the refrigerating compartment.

At one end of the refrigerating compartment is disposed an air circulating unit composed of a motor 16 (Fig. 5), and on each end of its armature shaft is mounted a blower 17. A thermostatic switch 18 is arranged in the motor circuit 19 and is adapted to open and close the motor circuit when required by changes in temperature within the duct 14, determined by the bulb 20, disposed adjacent the air intake of one of the blowers 17. In Figure 5 is also revealed the circuit 21 which is adapted to energize the fluorescent lighting fixture 22 which is mounted along the top of the front panel of the case.

In Figure 6 is shown schematically the refrigerating system of the invention which, being conventional and amply inscribed with identifying wording, is considered self-explanatory.

A small opening is provided at one end of the storage compartment through which access is had to a switch 22a, which controls the circuit to an expansion valve 22b, the latter, in turn, being controlled through a bulb 22c, disposed adjacent one end of the refrigerating coil 15. The switch opening however remains closed by a hinged plate 23a which is opened only to operate the switch 22a.

Adjacent the top of the storage compartment at each end is an opening 23. These openings constitute the only communication between the compartment and the air duct 14 and are closed at all times by pivoted dampers 24, except on rare occasions when excess condensation occurs on the walls of the storage compartment, caused by too frequent opening of the doors 12 of the case. When this occurs, the dampers 24 are opened slightly to allow a small amount of refrigerated air to pass from the duct 14 into the storage compartment. However, it is not recommended that these vents 23 be left open for long periods, due to the fact that air admitted to the storage chamber from outside the case will enter the duct 14 and cause frost to accumulate on the coil 15. This is a condition which is objectionable in conventional meat refrigerating cases in which the coils are exposed to the air in the storage compartment as well as outside air admitted to the compartment and, as a consequence, frost accumulates on the coils, drawing moisture from the air, thereby dehydrating and discoloring the meat in the case.

The invention successfully overcomes the above condition since no air which enters the case 10 through heat leakage or through opening of the doors 12 can reach the coil 15 and therefore no frost can accumulate. When the doors are opened, fresh warm air is admitted to the case and as this new air cools, it condenses and adds more humidity to the air already in the case, with the result that dehydration is entirely eliminated or reduced to the absolute minimum.

In Figures 7 to 12 inclusive the invention is shown as being adapted to a walk-in type of refrigerator. The same principal is involved although the closed air circulating duct, instead of embracing the ends, top and bottom of the case, is confined to the area of the ceiling of the case.

Reference numeral 25 denotes generally the insulated case which has a door 26 in one end. Around the walls of the case adjacent the ceiling thereof is a continuous air duct 27, through which air is caused to circulate by means of a fan 28, operated by a motor 29. Disposed forwardly of the fan 28 is a refrigerating coil 30 across which the air is constrained to flow in its course through the duct 27.

The heat of the storage compartment A of the refrigerator is absorbed from the heat of the duct 27 and the centrally disposed communicating duct 31, into which the circulating air is influenced from the duct 27 by a curved baffle 32 (Fig. 8).

During normal operation, the ducts 27 and 31 are closed to the storage compartment A of the case so that warm air admitted to this compartment when the door thereof is opened will not reach the coil 30 and cause frost to accumulate thereon. This is a condition sought to be avoided because of the tendency of the frost to absorb moisture and deprive the storage compartment of the proper humidity. However, there will be occasions when the door of the storage compartment will be opened frequently. During these periods excess amounts of warm air will enter the storage compartment, causing undue condensation on the walls of the latter. To minimize this condition the duct 27 is provided with spaced vents 33 which effect communication between the ducts and storage compartment A and by opening hinged dampers or closures 34 for these vents, the temperatures in the ducts and storage compartment may be brought into better balance by admitting cold air into the compartment from the duct and thus obviate sweating on the walls of the compartment. The vents 33 are required to be closed as soon as excess sweating, as described, has been eliminated.

To prevent condensate accumulating on the duct 31 from dripping onto the contents of the storage compartment A, the duct is formed with a V-shaped bottom, as shown in Figure 9, to converge the flow of water into a trough 35 suspended therebelow, which trough conveys the water to an end of the compartment and away from the contents of the case.

Thermostatic control of temperature in the duct 27 is accomplished through the medium of a bulb 36 disposed in the air-stream adjacent the fan 28, which bulb actuates a thermostatic switch 37 in the fan circuit. A bulb 38 disposed adjacent the refrigerating coil determines the operating periods of the refrigerating system shown in Figure 12, through the medium of an expansion valve 39, access to which is had through a door 40 in one wall of the duct 27 (Fig. 8).

It is apparent from the foregoing that meats which have been partially dehydrated when placed in the case are actually reconditioned, that is to say, further drying is suspended and the natural color thereof restored.

Manifestly, the construction as shown and described is capable of some modification and such modification as may be construed to fall within the scope and meaning of the appended claims is also considered to be within the spirit and intent of the invention.

What is claimed is:

1. In a walk-in type refrigerator, a storage compartment, a door therefor, a continuous air circulating duct in juxtaposition to the side and end walls of said refrigerator adjacent the top thereof, a longitudinal duct disposed between and parallel with the portions of said air circulating duct lying along the side walls of said refrigerator and effecting communication between the portions of said air circulation duct lying along the ends of said refrigerator, said continuous and longitudinal ducts being in thermal contact with said storage compartment but normally out of communication therewith, a refrigerating coil in said continuous duct, means for circulating air in said ducts and means for admitting limited quantities of cold air into said storage compartment from said continuous duct to dispel excess moisture condensation set up by ingress of external air into said storage compartment.

2. In a refrigerator, a storage compartment having a door, a continuous, normally closed air duct within said refrigerator and extending along the end and side walls of said refrigerator in the top thereof and in heat exchange relationship with said storage compartment, means for circulating air in said duct, a refrigerating coil also in said duct, a normally closed opening in each of the portions of said continuous duct lying in the end of said refrigerator adapted to be opened to admit chilled air from the continuous duct to the storage compartment to reduce the temperature of external air entering the compartment through the doors thereof and arrest excessive condensation resulting from said external air, a longitudinal duct in said refrigerator of substantially V shape in transverse section and connecting the end portions of said continuous duct one to the other, baffle means for influencing air from said continuous duct into said longitudinal duct and means for receiving and draining off moisture of condensation collecting on the walls of said longitudinal duct.

JOHN S. BOOTH.

REFERENCES CITED

The following references are of record in the file of this patent:

UNITED STATES PATENTS

| Number | Name | Date |
| --- | --- | --- |
| 1,947,442 | Baker | Feb. 20, 1934 |
| 2,108,876 | Vandoren | Feb. 22, 1938 |
| 2,180,974 | Atchison | Nov. 21, 1939 |
| 2,190,388 | Sparks | Feb. 13, 1940 |
| 2,285,946 | Kalischer | June 9, 1942 |
| 2,346,837 | Grooms | Apr. 18, 1944 |